United States Patent
McClintock et al.

(10) Patent No.: US 9,609,139 B1
(45) Date of Patent: *Mar. 28, 2017

(54) METHODS AND SYSTEMS FOR PROVIDING TELECOMMUNICATIONS SERVICES

(71) Applicant: CALLWAVE COMMUNICATIONS, LLC, Brookline, MA (US)

(72) Inventors: David C. McClintock, Santa Barbara, CA (US); David S. Trandal, Santa Barbara, CA (US)

(73) Assignee: Callwave Communications, LLC, Brookline, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/053,885

(22) Filed: Feb. 25, 2016

Related U.S. Application Data

(63) Continuation of application No. 14/558,527, filed on Dec. 2, 2014, now Pat. No. 9,294,627, which is a
(Continued)

(51) Int. Cl.
| | |
|---|---|
| *H04M 3/42* | (2006.01) |
| *H04M 3/48* | (2006.01) |
| *H04L 12/66* | (2006.01) |
| *H04M 3/537* | (2006.01) |
| *H04W 4/14* | (2009.01) |

(Continued)

(52) U.S. Cl.
CPC .......... *H04M 3/537* (2013.01); *H04L 51/046* (2013.01); *H04M 1/72552* (2013.01); *H04M 3/465* (2013.01); *H04M 7/0021* (2013.01); *H04W 4/14* (2013.01)

(58) Field of Classification Search
CPC ......... H04M 3/42195; H04M 3/42382; H04M 7/003; H04M 2203/253
USPC .......... 379/201.01, 210.01, 216.01; 715/700; 725/37
See application file for complete search history.

(56) References Cited

U.S. PATENT DOCUMENTS

| | | |
|---|---|---|
| 5,526,407 A | 6/1996 | Russell et al. |
| 5,533,106 A | 7/1996 | Blumhardt |

(Continued)

FOREIGN PATENT DOCUMENTS

| | | |
|---|---|---|
| EP | 11/20954 | 8/2001 |
| JP | 10/513632 | 12/1998 |

(Continued)

*Primary Examiner* — Harry S Hong
(74) *Attorney, Agent, or Firm* — Knobbe, Martens, Olson & Bear LLP

(57) ABSTRACT

The present invention is related to telecommunications. A call processing system receives a first call from a caller intended for a first person. A notification regarding the first call is transmitted over a network to a terminal associated with the first person. A user interface is displayed on the terminal via which the first person can indicate that a callback message is to be transmitted to the caller. The callback message is transmitted to the caller, wherein the callback message includes an identification of the first person, a callback control, and text indicating that the caller is to activate the control to initiate another call to the first person. At least partly in response to the caller activating the control, A second call to be placed via which the first person and caller are connected.

20 Claims, 11 Drawing Sheets

Related U.S. Application Data continuation of application No. 14/175,926, filed on Feb. 7, 2014, now Pat. No. 8,908,848, which is a continuation of application No. 13/689,431, filed on Nov. 29, 2012, now Pat. No. 8,649,495, which is a continuation of application No. 13/349,855, filed on Jan. 13, 2012, now Pat. No. 8,325,897, which is a continuation of application No. 11/935,957, filed on Nov. 6, 2007, now Pat. No. 8,102,986.

(60) Provisional application No. 60/858,171, filed on Nov. 10, 2006.

(51) Int. Cl.
  *H04M 3/46* (2006.01)
  *H04M 7/00* (2006.01)
  *H04M 1/725* (2006.01)
  *H04L 12/58* (2006.01)

(56) References Cited

U.S. PATENT DOCUMENTS

| | | |
|---|---|---|
| 5,805,587 A | 9/1998 | Norris et al. |
| 5,813,008 A | 9/1998 | Benson |
| 5,943,397 A | 8/1999 | Gabin et al. |
| 5,966,663 A | 10/1999 | Gleason |
| 6,018,762 A | 1/2000 | Brunson |
| 6,175,622 B1 | 1/2001 | Chiniwala et al. |
| 6,289,372 B1 | 9/2001 | Vyaznikov |
| 6,353,660 B1 | 3/2002 | Burger et al. |
| 6,466,654 B1 | 10/2002 | Cooper |
| 6,477,246 B1 | 11/2002 | Dolan et al. |
| 6,493,443 B1 | 12/2002 | Furman et al. |
| 6,526,042 B1 * | 2/2003 | Pinard .................... H04L 12/58 370/352 |
| 6,526,127 B1 | 2/2003 | Piotrowski et al. |
| 6,606,373 B1 | 8/2003 | Martin |
| 6,658,100 B1 | 12/2003 | Lund |
| 6,661,785 B1 | 12/2003 | Zhang et al. |
| 6,738,461 B2 | 5/2004 | Trandal et al. |
| 6,775,651 B1 | 8/2004 | Lewis et al. |
| 6,804,334 B1 | 10/2004 | Beasley et al. |
| 6,865,260 B1 | 3/2005 | Meadows et al. |
| 6,879,677 B2 | 4/2005 | Trandal et al. |
| 6,898,275 B2 | 5/2005 | Dolan et al. |
| 6,968,174 B1 | 11/2005 | Trandal et al. |
| 6,973,172 B1 | 12/2005 | Bitove et al. |
| 7,103,167 B2 | 9/2006 | Brahm et al. |
| 7,136,462 B2 | 11/2006 | Pelaez et al. |
| 7,254,222 B1 | 8/2007 | Bauer et al. |
| 7,266,185 B2 | 9/2007 | Trandal et al. |
| 7,292,841 B2 | 11/2007 | Trandal et al. |
| 7,305,069 B1 | 12/2007 | Day |
| 7,397,910 B2 | 7/2008 | Dolan et al. |
| 7,409,048 B2 | 8/2008 | Trandal et al. |
| 7,433,454 B2 | 10/2008 | Watanabe |
| 7,460,653 B2 | 12/2008 | Brahm et al. |
| 7,508,927 B1 | 3/2009 | Trandal et al. |
| 7,555,110 B2 | 6/2009 | Dolan et al. |
| 7,636,428 B2 | 12/2009 | Brahm et al. |
| 7,688,958 B2 | 3/2010 | Dolan et al. |
| 7,702,792 B2 | 4/2010 | Shaffer et al. |
| 7,715,543 B2 | 5/2010 | Unger |
| 7,742,586 B1 | 6/2010 | Trandal et al. |
| 7,818,734 B2 | 10/2010 | Giannini et al. |
| 7,822,188 B1 | 10/2010 | Kirchhoff et al. |
| 7,839,987 B1 | 11/2010 | Kirchhoff et al. |
| 7,852,749 B2 | 12/2010 | Mickle et al. |
| 8,073,429 B2 | 12/2011 | Karaoguz et al. |
| 8,081,750 B1 * | 12/2011 | Ehlinger .......... H04M 1/274516 379/355.02 |
| 8,102,986 B1 | 1/2012 | McClintock et al. |
| 8,325,897 B1 | 12/2012 | McClintock et al. |
| 8,447,285 B1 | 5/2013 | Bladon et al. |
| 2001/0045885 A1 | 11/2001 | Tett |
| 2002/0087549 A1 | 7/2002 | Mostafa |
| 2002/0087704 A1 | 7/2002 | Chesnais |
| 2002/0178002 A1 | 11/2002 | Boguraev et al. |
| 2004/0114747 A1 | 6/2004 | Trandal et al. |
| 2005/0013419 A1 | 1/2005 | Pelaez et al. |
| 2005/0123114 A1 | 6/2005 | Trandal et al. |
| 2005/0265322 A1 | 12/2005 | Hester |
| 2006/0126806 A1 | 6/2006 | Trandal et al. |
| 2006/0142012 A1 | 6/2006 | Kirchhoff et al. |
| 2006/0223502 A1 | 10/2006 | Doulton |
| 2007/0003047 A1 | 1/2007 | Batni et al. |
| 2007/0118357 A1 | 5/2007 | Kasravi et al. |
| 2007/0189267 A1 | 8/2007 | Metcalf et al. |
| 2007/0280434 A1 | 12/2007 | Howell et al. |
| 2008/0140398 A1 | 6/2008 | Shpigel |
| 2009/0262668 A1 * | 10/2009 | Hemar .................. G06Q 30/02 370/260 |
| 2010/0142685 A1 | 6/2010 | Dolan et al. |
| 2010/0184409 A1 | 7/2010 | Doulton |
| 2010/0232588 A1 | 9/2010 | Trandal et al. |
| 2011/0113343 A1 | 5/2011 | Trauth |
| 2011/0196926 A1 | 8/2011 | Crawford |
| 2011/0268260 A1 | 11/2011 | Madhavapeddi et al. |

FOREIGN PATENT DOCUMENTS

| | | |
|---|---|---|
| JP | 11/506292 | 6/1999 |
| JP | 01/168989 | 6/2001 |
| WO | WO 92/01350 | 1/1992 |
| WO | WO 97/26749 | 7/1997 |
| WO | WO 01/76210 | 10/2001 |

* cited by examiner

METHODS AND SYSTEMS FOR PROVIDING TELECOMMUNICATIONS SERVICES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

BACKGROUND OF THE INVENTION

Field of the Invention

The present invention is related to telecommunications, and in particular, to methods and systems for providing telecommunications services.

Description of the Related Art

Certain conventional telephone answering systems record messages and make them available to subscribers. These messages can be retrieved through a telephone user interface, and in some cases, the messages are transmitted to an email address and/or a telecommunication client application running on a personal computer.

SUMMARY OF THE INVENTION

Example embodiments are described herein that provide call notifications and enable calls to be placed.

An example embodiment provides a method of processing a call, comprising: receiving at a call processing system a first call from a caller intended for a first person; transmitting over a data network to a terminal associated with the first person a notification regarding the first call; causing at least in part a user interface to be displayed on the terminal via which the first person can indicate that a message is to be transmitted to the caller, the message including a link that when activated by the caller will initiate a second call with the first person; at least partly in response to receiving an indication from the first person that the message is to be transmitted to the caller, transmitting the message to a terminal associated with the caller; and at least partly in response to the caller activating the link, placing the second call to a communications device associated with the first person, placing a third call to a communications device associated with the caller, and bridging the first call and the second call.

An example embodiment provides a method of providing a callback message, comprising: receiving at a call processing system a first call from a caller intended for a first person; transmitting over a network to a terminal associated with the first person a notification regarding the first call; causing at least in part a user interface to be displayed on the terminal via which the first person can indicate that a message is to be transmitted to the caller; at least partly in response to receiving an indication from the first person that the message is to be transmitted to the caller, transmitting the message to the caller, wherein the message includes an identification of the first person, a callback control, and text indicating that the caller is to activate the control to initiate another call to the first person; at least partly in response to the caller activating the control, at least partly causing a second call to be placed via which the first person and caller are connected.

An example embodiment provides a system for transmitting a link, comprising: a telecommunications interface; a data network interface; and a call processing system coupled to the telecommunications interface and the data network interface, the call processing system configured to receive a first voice call via the telecommunications interface, transmit a first message using the data network to the intended recipient of the voice call via which the intended recipient can indicate that a callback message is to be transmitted to a second person that initiated the first voice call, and transmit a second message including text to the second person via which the second person can initiate a callback to the first person without incurring a fee for the callback call.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention.

DETAILED DESCRIPTION OF PREFERRED EMBODIMENTS

Figure 1:
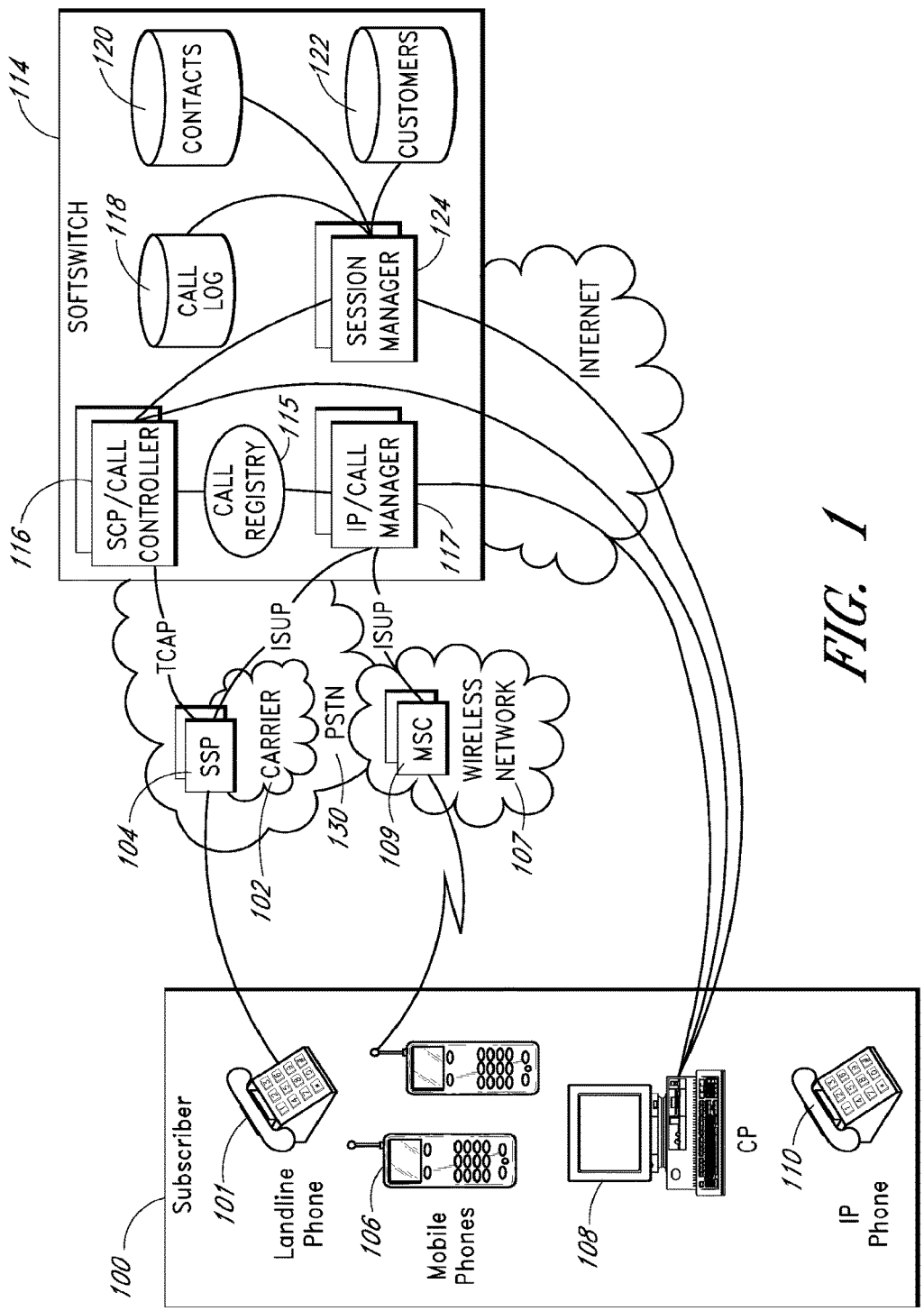
FIG. 1 illustrates an example network operating environment for advanced telecommunications services.

The present invention is related to telecommunications, and in particular, to methods and systems for providing subscribers with telecommunications services and for providing enhanced callback services.

GLOSSARY

AIN—Advanced Intelligent Network
CP—Carrier Partner

HTML—Hypertext Markup Language
HTTP—Hypertext Transfer Protocol
IP—Intelligent Peripheral
MMS—Multimedia message service
MSC—Mobile Switching Center
SCP—Service Control Point
SMS—Short Message Service
SS7—Signaling System 7
URL—Uniform Resource Locator
System and Operation Description
VoIP—Voice Over Internet Protocol Certain embodiments provide methods and systems via which a service provider can offer services that enable subscribers to forward call notifications and messages to callers. The call notifications contain a link or other control that can be used by a caller to "call back" a subscriber for free, at a reduced cost, or that, in addition to providing the call back provides one or more other benefits to the caller (e.g., a credit for a future call or a discount for some other product or service, such as a telecommunications service). Optionally, the call notifications and messages sent to the caller can include a URL link (or other link-type, such as other types of resource identifiers (e.g., eXtensible Resource Identifiers, Internationalized Resource Identifiers, etc.)) to a registration site where the caller can become a subscriber to call answering and/or other telecommunications services.

Providing subscribers with a link (e.g., a "free calling" link or a "reduced cost calling link") in their call notifications can simplify and reduce the cost to the subscriber of returning a call if the subscriber forwards the call notification back to the original caller. This call notification process and free calling for the caller improves the subscriber's overall communications experience, thereby increasing the attractiveness and value of the service provider's telecommunications service offering.

The notification/message transmitted to the caller optionally includes a promotional message for the service provider's services and/or other products/services. Providing a promotional message for the service provider's services or other products/services in the notification can reduce the provider's customer acquisition costs and/or can generate advertising revenues (e.g., from third parties paying a fee or benefit for the inclusion of promotional messages/links in such notifications/messages).

In an example embodiment, a telecommunications system provides subscribers with a call answering service for their cell phone, wireline phone, and/or VoIP call notifications. Notifications regarding missed calls and messages left by callers (e.g., left by callers in response to a prompt played by the telecommunications system and recorded by the telecommunications system and stored in memory) are transmitted to a subscriber (e.g., to an email address associated with the subscriber) as a file or as a link embedded in or attached to an email (or other communication capable of including a link and/or a file). The subscriber can access the messages (e.g., via a computer system, such as a personal computer, smart phone, interactive television, etc.) and review, reply, delete, and/or forward the message, by way of example.

Optionally, if the subscriber replies or forwards the notification to a caller (e.g., when the subscriber is available to speak with the caller), the caller can click on an embedded link (or other control) in the message in order to call the subscriber back. Optionally, the subscriber can include a message in the notification (e.g., informing the caller when the subscriber will be available to speak with the caller). Optionally, the subscriber can specify the date and time the notification is to be transmitted to the caller using date and time scheduling fields. When the caller receives the notification and clicks on the link, a corresponding indication is provided to the call processing system (e.g., as a result of the corresponding URL being accessed by the caller device which received the notification and link click), which causes the call processing system to place a call to the original caller, then a call to the subscriber, and then the two calls are bridged upon answer by the subscriber, without requiring the original caller to redial the subscriber's phone number (optionally, the calls can be placed substantially simultaneously to the subscriber and caller and then bridged; or to the subscriber first, then the caller, and then the calls are bridged).

The original caller may decide s/he would like to subscribe to, or find out additional information regarding a service offered by the telecommunications system (e.g., one or more of the services described above, a similar service or other service). The original caller can select a corresponding embedded link (e.g., associated with text/icon that describes the services and/or instructs the caller to select the link to receiving more information about one or more services and/or to register for one or more services) within the email (or other communication) which directs the caller to an appropriate user interface (e.g., a online registration user interface, a faq (frequently asked questions) page, a promotional page or other appropriate user interface), such as one accessed over the Internet as a Web page.

Certain embodiments of the call processing system providing these types of call notification and messaging services use triggers, such as SS7 Advanced Intelligent Network (AIN) triggers. In an example embodiment, to support this service, the service provider configures a trigger at the appropriate points in an inbound and/or outbound call for a customer/subscriber. In an example embodiment, when a certain trigger fires, a softswitch (e.g., acting as a Service Control Point (SCP) in the SS7 network, and connecting calls from one phone line to another, using, for example, software running on a computer system), receives a query that enables the softswitch to control, at least in part, the call and optionally control the visual presentation of the call (or message) to the caller, and/or the called party.

In an example embodiment, enhanced call management and call routing services are provided via Common Channel Signaling (CCS) or Common Channel Interoffice Signaling (CCIS) information, such as, by way of example, via SS7 Intelligent Network (IN) triggers in the switches of local exchange telephone companies. For example, SS7 AIN triggers are set in the switches of carriers, such as Carrier Partners (e.g., carriers who are partners with a third party call processing operator in providing enhanced call processing services) to provide calling services. In another example, SS7 Wireless Intelligent Network (WIN) triggers are set in the mobile switches of wireless carriers, such as wireless carrier partners, to provide calling services. In another example, Non-Intelligent Network Signaling (e.g., ISDN, CLASS Call Forwarding services) is used to originate, terminate, forward, and bridge calls.

Throughout the following description, the term "Web site" or "Web" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well.

Further, while the description herein refers to example network and telephony standards and protocols, other standards and protocols can be used as well. In addition, while references may be made to electronic address books or contact lists, other data stores and formats can be used to store contact information. While certain intelligent network triggers are referred to herein, other triggers, events, or services can be used as well such as call forwarding, call bridging, call origination, and call termination for example. In addition, unless otherwise indicated, the functions described herein may be performed by executable code and instructions stored in computer readable memory and running on one or more processor-based systems. However, state machines, and/or hardwired electronic circuits can also be utilized. Further, with respect to the example processes described herein, not all the process states need to be reached, nor do the states have to be performed in the illustrated order. Further, certain process states that are illustrated as being serially performed can be performed in parallel.

Similarly, while certain examples may refer to a personal computer system or data device, other computer or electronic systems can be used as well, such as, without limitation, an interactive television, a networked-enabled personal digital assistant (PDA), a networked game console, a networked entertainment device, and so on. While certain references are made to certain example system components or services, other components and services can be used as well. In addition, while certain user inputs are described as being provided via phone key presses or by clicking on a button, optionally, user inputs can be provides using other techniques, such as by voice or otherwise. While certain phone numbers or addresses are referenced for purposes of illustration, other phone numbers, electronic addresses, locators, or identifiers can be used as well.

While certain examples refer to certain example messaging protocols (e.g., SMS or MMS, instant messaging, email) for illustrative purposes, other messaging protocols can be used as well.

Figure 2:
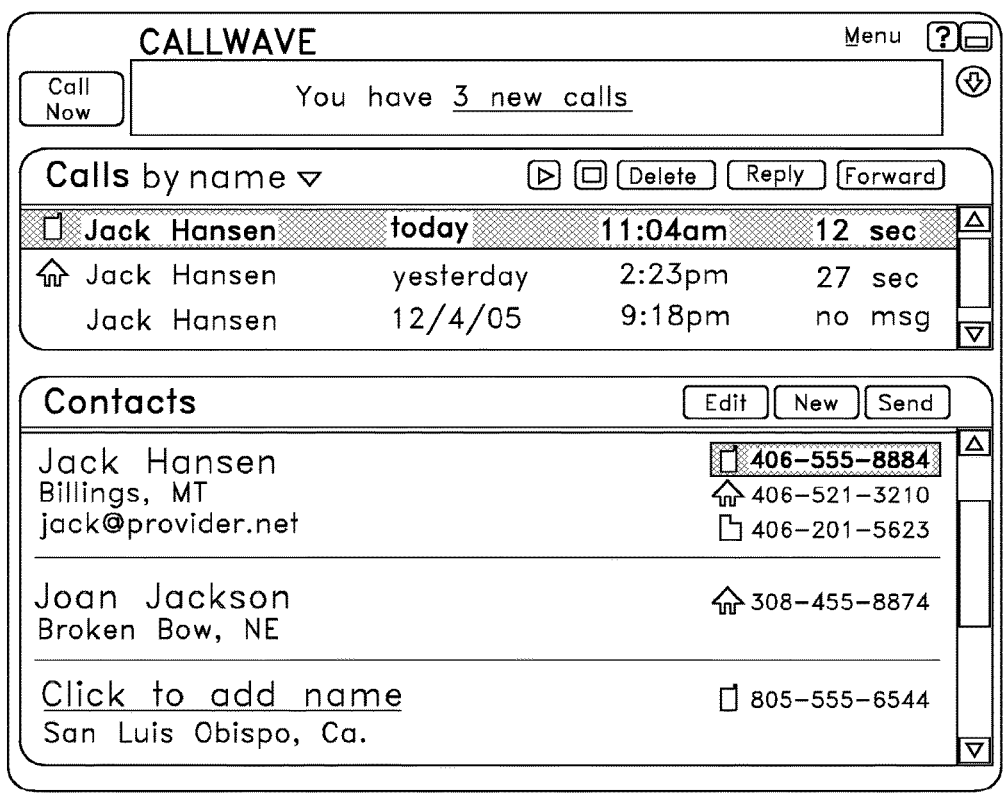
FIG. 2 illustrates a first example telecommunications client call log and user contacts user interface.

In addition, certain call management capabilities described herein utilize a telecommunications client (e.g., a personal computer client, a client hosted on an interactive television, a network personal digital assistant, a smart phone, or a wireless phone with an Internet connection, etc.) to give the customer access to and management of calls (e.g., see example client application user interface illustrated in FIG. 2). Optionally, a customer can have multiple clients hosted on multiple computers or other hosts. In an example embodiment, the telecommunications client application connects to and communicates with a softswitch via the Internet, an intranet, or other network.

The client application, executing on a subscriber's computer terminal or other host, can make the subscriber's online presence known to the softswitch (e.g., by transmitting a message over the Internet to the softswitch). Optionally, the client can be used to receive, edit, and display call log data from the softswitch (e.g., a list of calls placed to/received by the subscriber, or placed by the subscriber, including phone numbers, caller or called party names, date/time of the call, an indication as to whether a call was an outbound/inbound call, the city/state of the caller/called party, type of call voice or fax, etc.), and/or call alert data (e.g., for an active call, listing the caller phone number, name, city/state, and/or call status (e.g., ringing, playing greeting, recording caller message, terminating call, displaying fax)). Optionally, the call alert also plays an audible signal, such as a ring tone.

The client application can display a log of recorded messages from callers, and optionally can provide playback controls (e.g., play, fast forward, rewind) for playing back or displaying the recorded message (e.g., a voice message, a video message, a fax message, etc.) via the client computer terminal. The client optionally can also be used to screen calls (e.g., wherein the softswitch streams a message being left by a caller to the client so that the called party can listen to the message in substantially real time) and to instruct the softswitch to accept calls on the host computer terminal, forward calls, refuse calls, initiate call conferencing, and to otherwise provide call handling instructions. Options are also provided in the client to respond to calls using a text reply option (e.g., via an SMS message) and/or multimedia reply option (e.g., via an MMS message). In addition, options are provided whereby a user can search their call log database, contact database and/or the web.

By way of example, with respect to call alerts, when a call alert is received by the client, as part of call presentation, a ringing sound is optionally played via the client host. If the host is a portable device with a vibration option enabled, optionally the call alert will cause the portable device to vibrate in addition or instead of providing an audible alert. Optionally, the incoming call is displayed in a call alert user interface for a first amount of time (e.g., a set time, such as 5 seconds, or for a user configurable period of time), and then the call appears in the associated call log.

Referring to FIG. 2, an example call log user interface, such as one that can be displayed via the telecommunications client, is illustrated. In this example interface, a call is indicated by an entry in the log. A log entry can include some or all of the following: a caller name, a caller phone address/identifier, a call time/date, a call type, a message/fax length (where a message has been recorded or a fax received), an indication as to whether the user has viewed the log entry, an indication as to whether the user has played a recorded caller message (where a message has been recorded), an indication as to whether the user has viewed a fax (where a fax has been received), etc. In addition, the number of new calls received is displayed in a status field.

Optionally, the customer can instruct the user interface (e.g., via a menu selection or by clicking on a field title) to sort the log by name, by call type (e.g., voice message, fax call, etc.), by time/date, by message length (optionally, voice messages are displayed first, sorted by message length in time, then fax messages are displayed, sorted by page length, although fax messages can be displayed first, and voice messages second).

When a call is selected in the call log user interface, the associated contact record (e.g., including the caller name, address, email address, phone number, fax number, and/or other information) is optionally displayed in a Contacts area (e.g., a window). Other contact records may be displayed as well.

A customer with an Outcall service enabled (e.g., via their account associated with the softswitch services), enabling the customer to place a call via the softswitch, has an example "Call Now" button as illustrated in FIG. 2. When the Call Now button is clicked or otherwise activated, a call is initiated to the call or contact that currently is selected (e.g., in the call log). The call origination begins with the softswitch calling the customer's landline phone (or other designated default phone). Optionally, instead the softswitch can first call the destination selected destination. If the customer has configured more than one phone (e.g., a landline phone and a mobile cell phone), clicking the Call Now button in the example user interface results in a drop down menu (or other selection interface) via which a user can select the phone to be used (e.g., "from my home phone", "from my cell phone").

Figure 3:
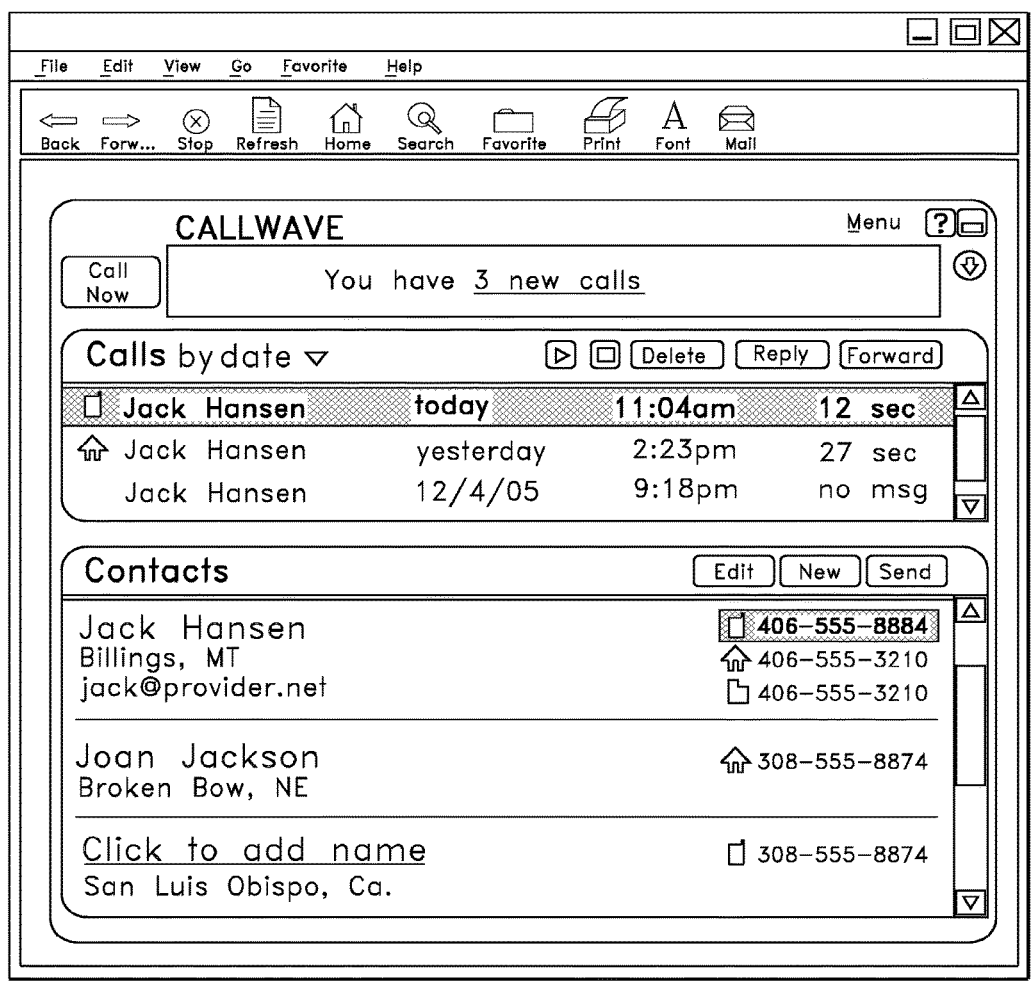
FIG. 3 illustrates a second example user interface of a call log and user contacts.

A telecommunications client is just an example user interface. FIG. 3 illustrates another example call log user interface presented via a browser to a customer. The browser can be executing on a computer terminal, such as a personal computer, a Wireless Application Protocol (WAP)-enabled phone, a smart phone, a PDA or the like. The call log can be accessed by supplying the appropriate URL to the browser and optionally providing log-on information, such as a user name and a password.

Figure 4:
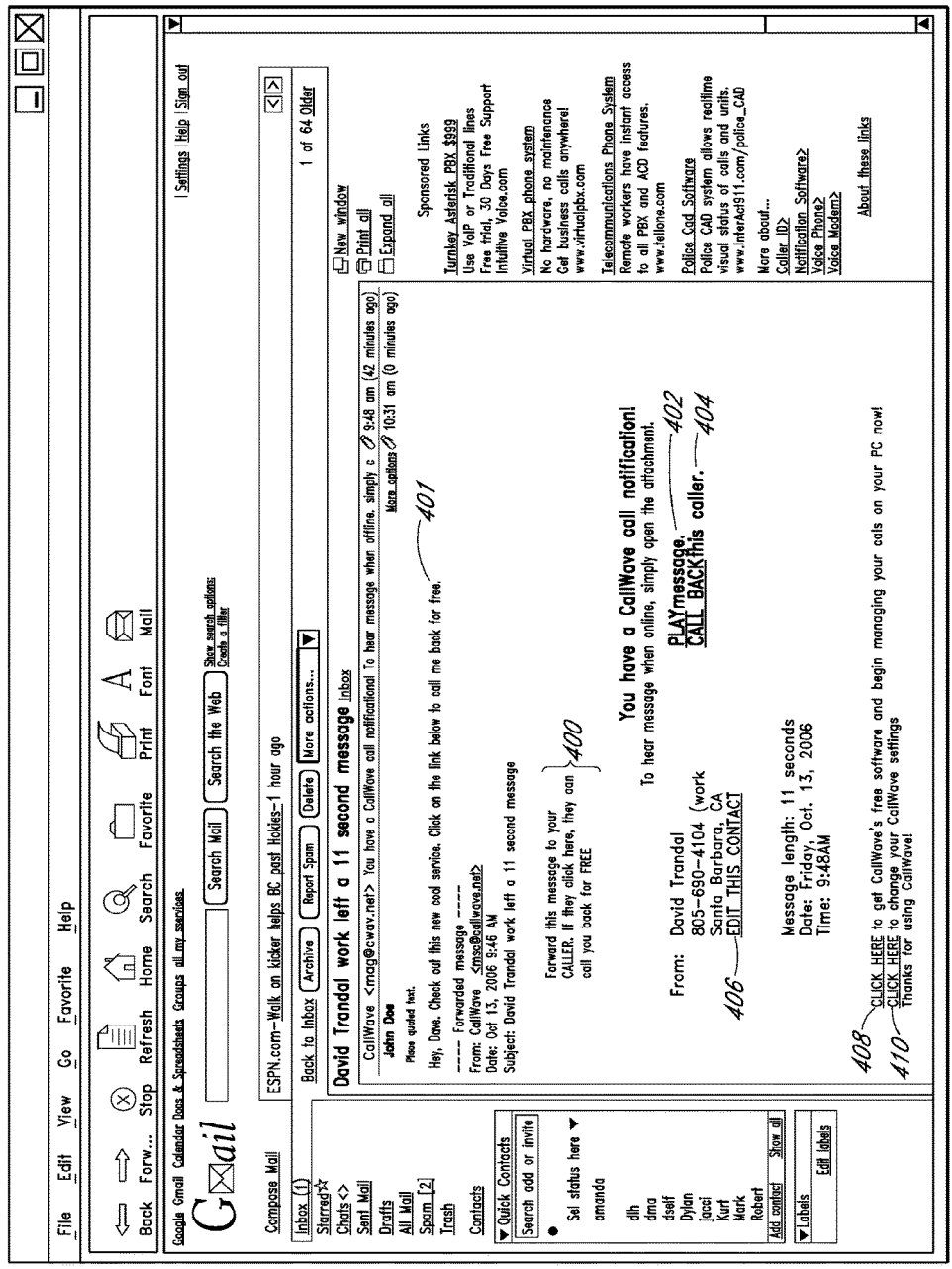
FIG. 4 illustrates an example Email Call Notification with an embedded Caller Call Back link.

FIG. 4 illustrates still another example method via which users can receive call notifications and voice messages. In this example, John Doe, a Google® Gmail® user has just received a 10 second voice message via email from a caller, David Trandal. The email reports who left the message, the phone address or other phone identifier (e.g., work phone), caller location (e.g., address, city, and/or state as determined by the softswitch from call signaling information a contact record associated with the caller or otherwise), the message length, and the date/time of the call. From this visual web interface, a subscriber can play a received message which is attached as a file using a play control (e.g., a PLAY link 402), call the subscriber back (e.g., via a CALL BACK link 404), and edit the contact information associated with the caller (e.g., via an EDIT link 406). In addition, the email includes a link 408 to download a telecommunications client as described above, and a link 410 to change settings associated with the call answering service or other services provided via the softswitch.

The user interface further includes a notification 400 to the subscriber that if the message is forwarded to the original caller (David Trandal), a link will be included that can be used by the caller to call the subscriber John Doe back (for free in this example), in addition to an associated message 401 (optionally editable or customizable by or for the subscriber) informing the original caller of the purpose of the link and that use of the service provided via the link will enable the caller to experience certain aspects of the service without charge (e.g., "Hey, Dave. Check out this new cool service. Click on the link below to call me back for free."). Optionally, advertisements are included on the web page used to access the email notification.

Figure 5:
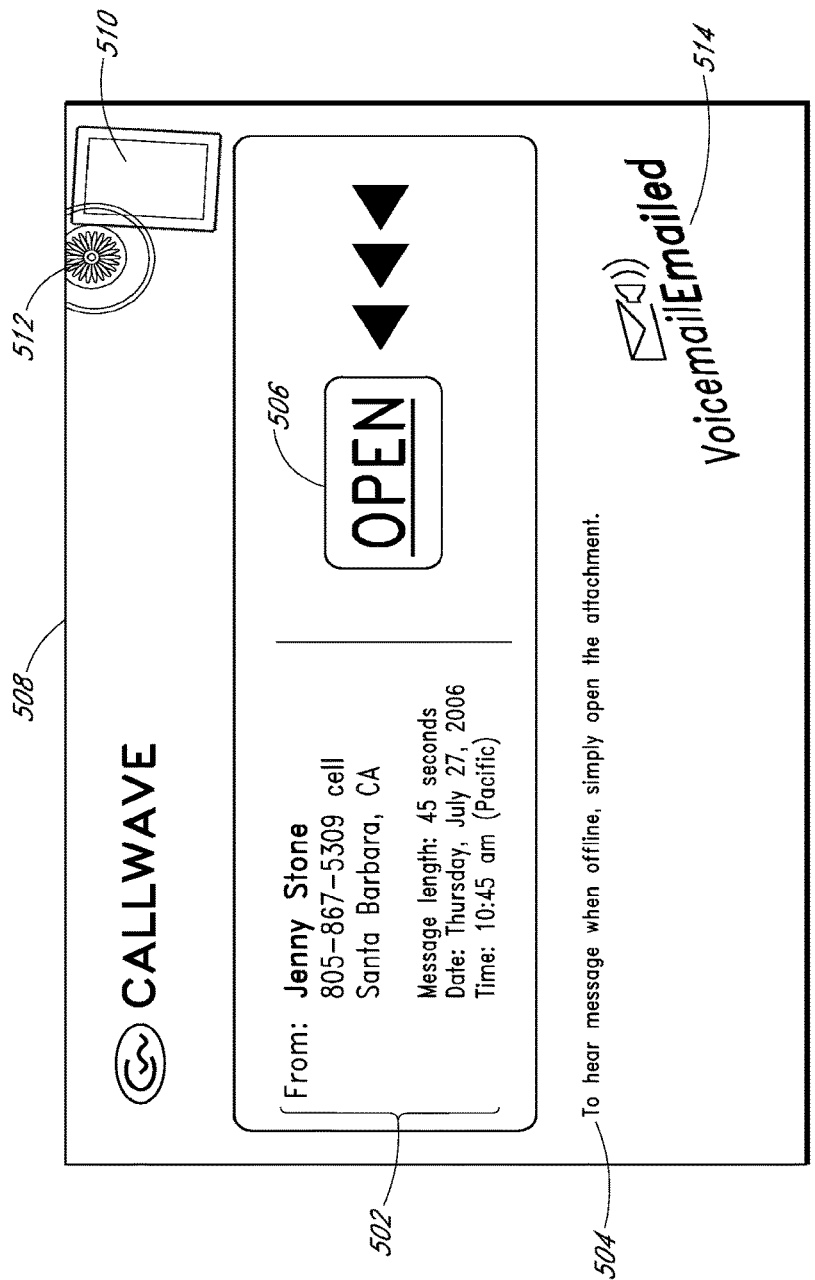
FIG. 5 illustrates an example Call Notification sent as a web-based Email.

Another example call notification which can be sent as an email is illustrated in FIG. 5 including attractive graphics. In this example, the email includes a "From" field 502, listing the name of the caller, the caller phone address, the call date/time, and the message length. Optionally, the message (e.g., voice or video) may be attached as a file to the email (enabling offline access), and/or a link may be included to an online message data store from which the message can be retrieved. Not all the foregoing information need be provided. For example, if the caller has caller ID blocking, the phone address is not displayed. If no message was left and the notification is merely informing the subscriber that a call was missed, message length information may be left blank, set to zero, or the message length field may be omitted altogether. An "open" control 506 is provided with an associated notification 504 informing the user that if the user opens the attachment, the message will be played back to the user. In this example, the email includes an image 508 that appears to be an envelope (e.g., a hardcopy envelope), with an image of a stamp 510, a postmark 512, and a voice mailed/emailed mark 514 to enhance the "mail" association. Optionally, the email may be in the form of an HTML email, using enriched text, or otherwise.

Figure 6:
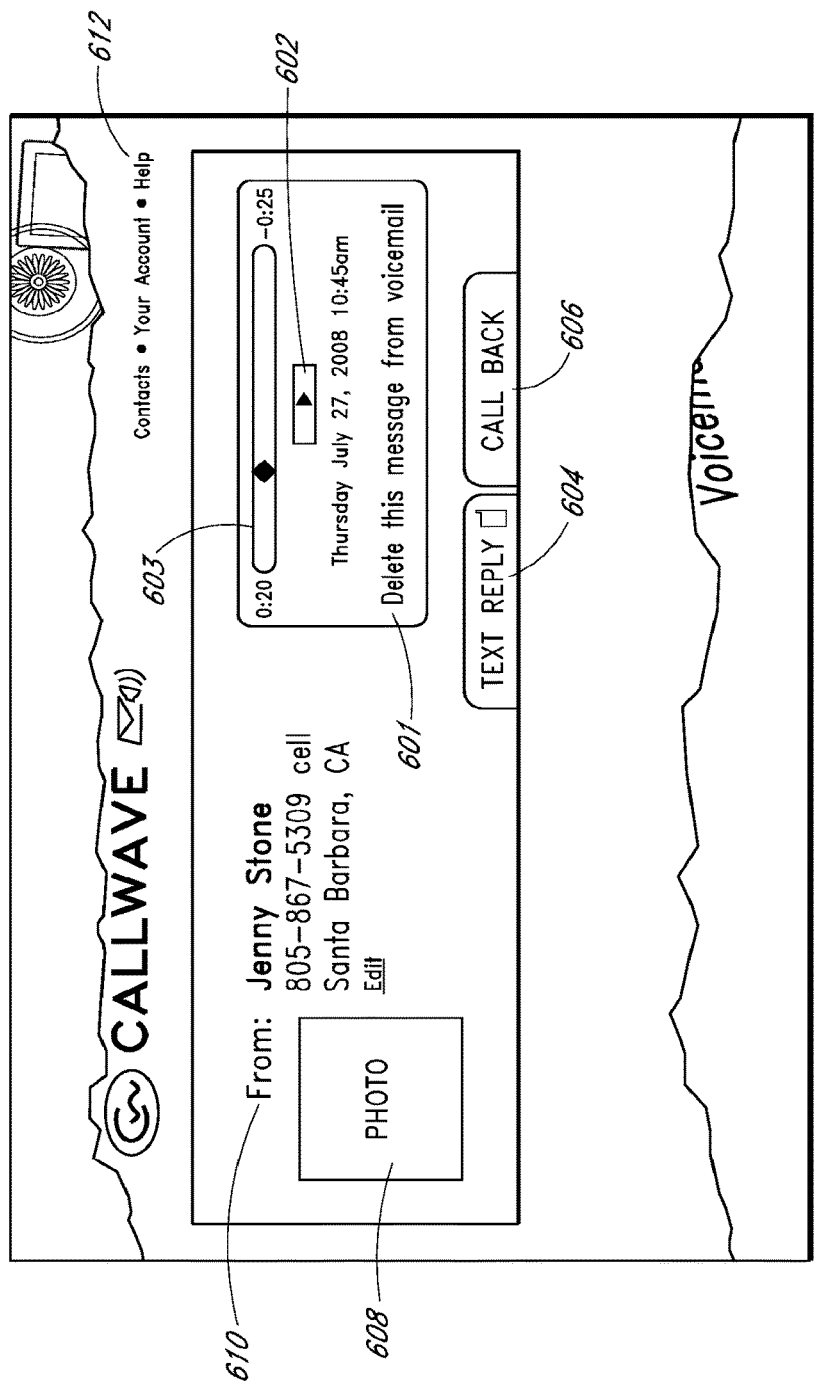
FIG. 6 illustrates an example Call Notification web-based Email with message playing.

FIG. 6 is an example of a call notification which has been "opened" (e.g., wherein the image is altered/changed so that the "envelope", including the stamp and watermark, appears to be torn open). Once opened, optionally, the message automatically plays, or the message plays after the subscriber activates the appropriate playback control 602. Optionally, other playback controls may be provided (e.g., rewind, fast forward, pause, etc.). While in this example the message is a voice message, optionally video messages, fax messages, or other message types can be communicated via the call notification. In this example, a text reply control 604 is provided, which when activated will cause a text reply process to be initiated. Optionally, in addition or instead, a multimedia message reply control is provided, which when activated will cause a multimedia reply process to be initiated. In addition, a "call back" control is provided, which when activated, causes a caller callback procedure to be initiated (e.g., where the system calls the caller phone address, a subscriber phone address, and when and if the parties answer the calls, the system bridges the calls together).

The "opened" call notification in this example also includes an image 608 of the caller (e.g., obtained via a contact data store record using call signaling information, such as the caller phone address, as a search term), and a "From" field listing the caller name, the calling phone address, an indication (via an icon) as to whether the call was placed from the caller's mobile phone, home landline phone, work phone, etc. (e.g., obtained via the contact data store record using the caller phone address), and the time/date of the call. A playback status bar 603 is provided that visually indicates the progress of the message playback as well as the message length. A "delete" control 601 is provided, which when activated, causes the notification email to be deleted. Links 612 are provided via which the subscriber may access their electronic contacts address book, an account management user interface, and help.

The functionality, operation, and implementation for an example service promoting and registering subscribers to telecommunications services will now be described in further detail.

FIG. 1 illustrates an example telecommunications network environment via which enhanced services can be provided.

A service provider or carrier (e.g., a Carrier Partner) customer 100 may have one or more landline phones 101 that connect to a local exchange switch or an SSP (Service Switching Point) 104 in the carrier's network 102. The customer may also have one or more mobile phones 106 and one or more hosts 108 (e.g., personal computers, networked televisions, personal digital assistants, smart phone, etc.) running a telecommunications client. In addition, a customer may have one or more phones 110 connected to a broadband connection (e.g., via a cable modem or DSL modem) wherein the phone (e.g., an analog phone coupled to an analog phone adapter (ATA), a VoIP phone, a Skype phone, etc.) digitizes and packetizes voice data before transmitting over the broadband connection (e.g., using SIP or other protocol) to a call routing service provider or other destination.

The telecommunications client has one or more user interfaces that display some or all of the following: a call log, text messages, a contact record/list, an optional automated character, and active, in-progress calls. In an example embodiment, the customer can elect to screen or take an active call or respond to a caller with a message that will be viewable by the caller, such as a text message or a multimedia message (e.g., an SMS message or MMS message). Optionally, calls can also be made (originated) via the telecommunications client (e.g., where the host is equipped with a speaker and microphone). Optionally, information about a caller can be retrieved through a search function (e.g., wherein information regarding the caller is searched for over the Internet and/or via proprietary databases, such as databases reflecting an individual's or company's credit worthiness).

In this example, the softswitch 114 has a number of optional components, some of which are optionally centralized at a given location, others of which may be co-located in the carrier's network (e.g., to reduce network transport costs). An SCP (Service Control Point) 116 is an optional AIN component that interacts with the SSPs 104 (e.g., using the TCAP protocol). In an example embodiment, triggers, such as AIN triggers, are armed for the customer's phone number/address/account (e.g., landline phone line) so that when calls are made to or from a corresponding phone, a trigger fires and causes the SSP 104 to query the SCP 116 for instructions on how to handle the call. The SCP 116 is optionally also configured to perform TCAP queries to other SS7 components as needed by some services (e.g., request Automatic Callback from another carrier's switch when a line becomes idle).

In an example non-AIN deployment, the softswitch 114 optionally interconnects with the PSTN 130 using, by way of example, SS7 signaling. In this case, in an example embodiment, the SS7 signaling information associated with a call terminates on a Call Controller subsystem 116 or the like, and the trunks (or bearer channels) terminate on one or more Call Managers 117 (described further below). Optionally, the Call Controller subsystem 116 and/or associated functions thereof, are included in the Call Manager subsystem 117.

In an example IP (e.g., VoIP) deployment scenario, the softswitch 114 interconnects with the PSTN 130 through an IP connection using, for example, Session Initiated Protocol (SIP) signaling. The IP network is optionally directly connected to Internet devices or calls are gatewayed from IP-to-PSTN at Network Points-of-Presence (NetPOP) which provide access points to the Internet.

In an example embodiment, triggers, such as SS7 Wireless Intelligent Network (WIN) triggers, are set in the mobile switches of one or more wireless carriers (e.g., Wireless Carrier Partners) to provide similar calling services as described herein with respect to a landline phone for a customer's mobile phone number/address/account.

In an example embodiment, the softswitch 114 also contains one or more systems referred to as Call Managers 117. The Call Managers 117 are connected to the PSTN 130 (e.g., via ISDN using the ISUP protocol, by way of example, although other protocols can be used). The Call Managers 117 provide some or all of the following: a call screening service when screening is to be provided, record a message from a caller that is to be recorded, provide a voice prompt or message that is to be played to a caller and/or called party, record a facsimile document, detect speech or DTMF tones, convert speech that needs to be converted to text, and/or provide a gateway between the SS7-based networks (PSTN) and SIP-based networks (VoIP).

The example Call Manager 117 optionally can also act as an IP (Intelligent Peripheral), another AIN component that the SCP 116 can instruct the SSP 104 to connect into the call for interaction with the called and calling party. The IP/Call Managers 117 and SCPs 116 in the softswitch 114 optionally share a Call Registry 115 that stores information about active calls. The Call Manager 117 can communicate with the mobile phones 106 across the PSTN 130 over a wireless network 107 via the corresponding MSC 109.

One or more Session Managers 124 (e.g., in the softswitch 114) optionally track telecommunication client presence and interact with a given telecommunications client (e.g., a client application hosted on a personal computer, PDA, smart phone, or a networked television) as call log, contact, and/or customer data needs to be synchronized with one or more databases (e.g., centralized or distributed databases, such as a call log database, 118, a contacts database 120, and/or a customers database 122) to provide the customer, via the client, with updated log, contact, and/or customer data.

The Session Manager(s) 124 also optionally provide the SCP in an AIN environment and the Call Manager in a non-AIN environment with service configuration information for the customer involved in a call. During an active call, the SCP 116 and/or IP/Call Manager 117 optionally directly or indirectly interact with the telecommunications client to provide call progress information, and to stream audio and/or visual content.

The softswitch 114 in this example contains centralized databases and/or a general-purpose storage area, optionally including, but not limited to, some or all of the following: a call log database 118, a contacts database 120, and a customer database 122. Optionally, the databases are not centralized and may be distributed geographically and/or over different systems. The call log database 118 stores call events and related data for incoming and/or outgoing calls and text and/or multimedia messages. The contacts database 120 stores information and parameters (e.g., names, identifiers, and/or phone numbers/addresses, birthdays, notes, automated characters, etc.) associated with a sender, called, or calling party. The customer database 122 stores information and parameters (e.g., account data and configuration information) associated with subscribers/customers/users.

The softswitch call processing system 114 optionally includes other subsystems (not shown), such as some or all of the following: a router subsystem, which serves as an interface to the Internet to manage communications between online IP client devices and call processing servers, a web server subsystem to manage a "web site" associated with the softswitch (e.g., via which a user can access an account set-up/configuration user interface, a call log, a contacts database, etc., using a browser or other network user interface), etc. These subsystems are optionally interconnected via a Local Area Network (LAN), a Wide Area Private Network (WAN), and/or a Wide Area Public Network (e.g., Internet).

Internet protocol telephony, such as VoIP (voice over Internet protocol), may use, in whole or in part, the Session Initiation Protocol (SIP) as the signaling protocol. SIP is a standardized signaling protocol which can be used for Internet conferencing, telephony, presence, events notification and instant messaging. The Session Initiation Protocol is currently an Internet Engineering Task Force (IETF) standard protocol. There may be several versions and implementations of SIP. SIP, by way of example, enables one or more of the following services to be provided, using proxy servers and end user client systems:
1. Call forwarding: call forwarding can be provided in response to one or more of the following conditions: ring-no answer, busy, unconditional call forwarding, address manipulations (such as permanent numbers (e.g., 700 numbers), free phone numbers (e.g., 800, 866 numbers), and paid information numbers (e.g., 900 numbers)).
2. Call recipient and calling number identification
3. Personal mobility
4. Caller and call recipient authentication
5. Invitations to a multicast conference
6. Basic Automatic Call Distribution (ACD)

A call may be routed partially over the Internet, using SIP, and partially over a circuit-switched network, such as a PSTN (public switched telephone network) or wireless network. The PSTN and wireless networks may utilize a variety of signaling and other standards, such as the SS7 signaling protocol.

SIP is a request-response protocol. In one embodiment, SIP can be used for establishing, manipulating and tearing down user sessions, wherein several users can optionally participate in a session. A session can optionally involve multimedia elements including audio, video, instant messaging, and/or other real-time data communications. By way of further example, a session can be an Internet multimedia conference, an Internet telephone call and/or a multimedia distribution session. Optionally, session members can communicate using multicast and/or using a mesh of unicast relations.

SIP can optionally run over UDP (User Datagram Protocol), TCP, IP, ATM, X.25 and/or other protocols. In one embodiment, SIP can work in the Application layer of the Open Systems Interconnection (OSI) communications model.

By way of example, SIP invitations can be used to create sessions. The invitation can carry session descriptions that enable participants to agree on a set of compatible media types. SIP enables user mobility by providing proxy services and redirecting requests to the user's current location. For example, users can register their current location so that calls can be directed to a telephone or other terminal corresponding to the location.

An example system that can be used to support SIP can include some or all of the following components:

An endpoint component, sometimes referred to as a user agent (UA), which can be a hardware and/or software device implementing or compatible with SIP, such as an Internet Protocol (IP) phone or other terminal. The endpoint components can include a client used to initiate calls and a server used to answer calls. By way of further example, a SIP Proxy, a SIP phone, a call processing system, and so on, can be SIP endpoints.

A SIP network server that handles signaling associated with one or more calls. By way of example, in an optional embodiment, the network server provides name resolution and user location. The SIP network server can include one or more additional servers. For example, the SIP server can include a Register server used to receive registration messages from endpoints regarding current user location. Using a mapping database, the Register server can map the SIP addresses with the physical location or locations in the domain where the endpoint is located. The SIP network server can also include a proxy system that transmits call setup and tear down information and optionally forwards SIP messages to multiple proxy servers, creating a search tree, in order for the SIP messages to reach their destination. In addition, a SIP proxy can discover endpoint characteristics of an endpoint by consulting a list of registration templates, including dynamic configuration parameters, for that endpoint. The network server can also include a SIP Redirect server that enables endpoints to locate a desired address by redirecting one or more of the endpoint to another server.

SIP addresses can be the form of uniform resource locators (URL). By way of example, SIP addresses can optionally be embedded in Web pages. In certain applications, a user can click on a SIP address embedded in a Web or other electronic document, and in response, a call can be placed from the user terminal to the SIP address, and the user can then talk to the person or system associated with the SIP address and/or send data files to the person or system associated with the SIP address.

When making a SIP call using a SIP terminal, the SIP terminal locates the appropriate server and then sends a SIP request, such as an invitation that initiates a session. The request may directly reach the intended call recipient, or the request may be redirected or may trigger a chain of new SIP requests by proxies. If a call is to be routed through a number of different proxy servers, a redirect server can be used. When a caller's user agent sends an INVITE request to the redirect server, the redirect server contacts the location server to determine the path to the called party, and then the redirect server sends that information back to the caller. The caller terminal then acknowledges receipt of the information. The caller terminal then sends a request to the device indicated in the redirection information (e.g., the call recipient terminal or another server that will forward the request). Once the request reaches the call recipient terminal, the recipient terminal transmits a response and the caller acknowledges the response.

The Real Time Protocol (RTP), Real Time Control Protocol (RTCP), and/or other appropriate protocols can be used to send audio using packets over the Internet to allow the caller and call recipient to verbally communicate. By way of example, the packets can optionally be UDP packets.

Optionally, calls directed to one more selected numbers can be routed by a SIP provider to a call processing system optionally operated by a separate entity than the SIP provider. The call processing system can provide telephone services by integrating with one or more Internet Services Providers (ISP), SIP providers and/or other telephony providers.

Figure 11:
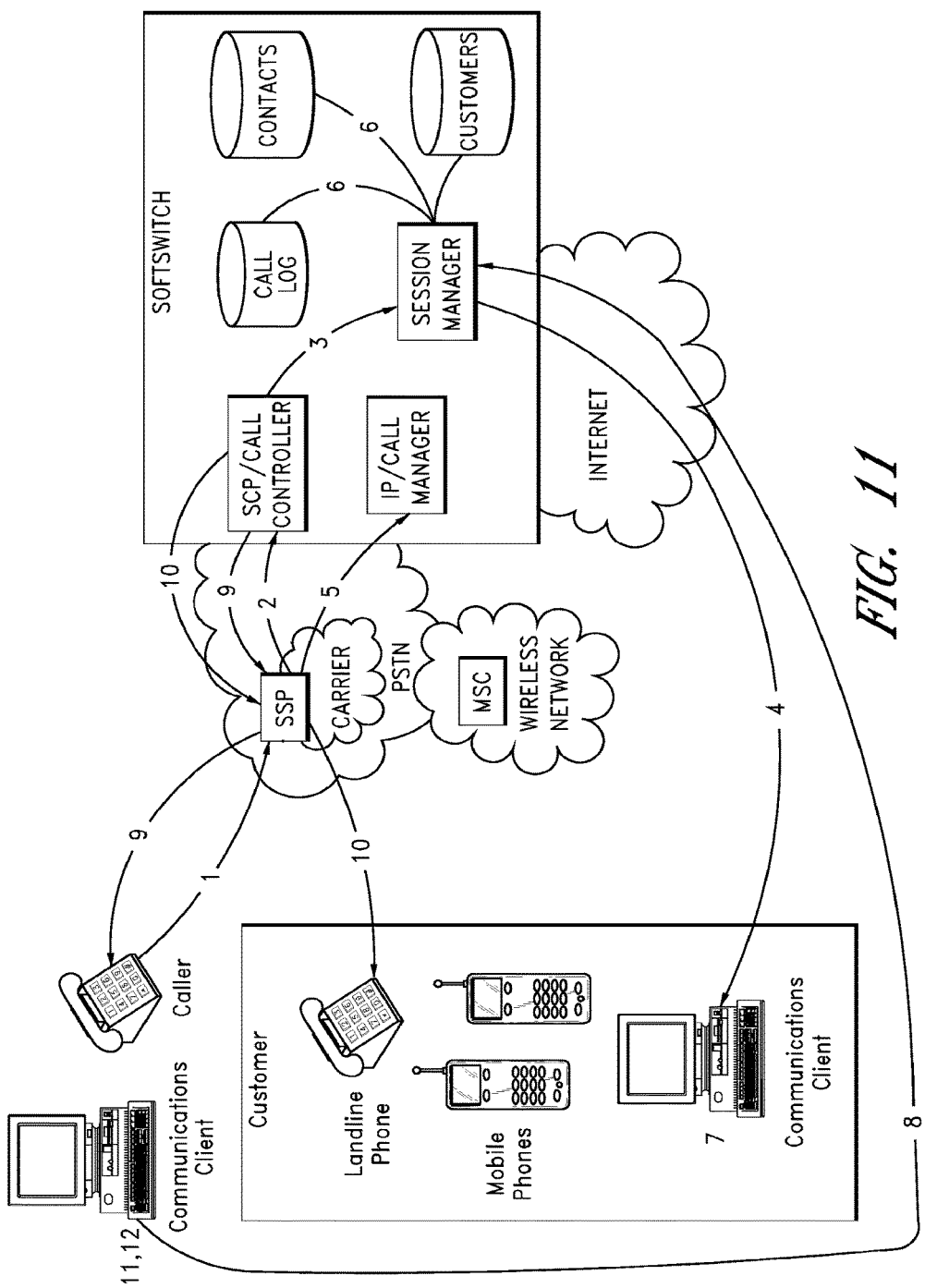
FIG. 11 illustrates an example operating environment and example call back service.

FIG. 11 depicts an example call scenario in which a caller dials a customer's phone address. The called party, a subscriber to a telecommunications service offering, is unavailable and a message is recorded by the softswitch and transmitted to the subscriber's email address. Later, the subscriber requests a call back by sending a free calling invitational email message to the caller, the message including a link to call the subscriber back and optionally including a portion of the recorded message or a link to the recorded message. The caller calls the subscriber back by clicking on the link and then, after the call, chooses to subscribe to a telecommunications service.

State 1. A Caller dials the customer's landline phone number/address (or other phone-type). The call is routed through the PSTN to a carrier (e.g., a CP). In this example, the call is routed to a carrier's Service Switching Point (SSP) serving the customer's landline phone.

State 2. Because the called party is unavailable in this example, the call is not answered by the called party. After a specified number of rings (e.g., a Ring-No-Answer Condition) and/or after a specified amount of time, the SSP forwards the call to a softswitch (e.g., an Enhanced Service Provider softswitch and/or Call Processing System). In the forwarded call, the SSP includes some or all of the call signaling information associated with the call, including, for example, the caller phone number/address, a privacy indicator, a designation of whether the call was a forwarded call, and/or the called party identifier (e.g., phone number/address or account number).

State 3. The receiving softswitch verifies the called phone number is that of a customer (e.g., a subscriber of a service offered by the operator of the softswitch and/or other entity having an account associated with the softswitch), optionally by determining if the called phone number or other identifier associated with the called party matches a customer number in the customer database (which stores customer account records). The softswitch SCP/Call Controller queries the softswitch Session Manager to obtain some or all of the following: service configuration for the customer being called, the customer's call location, the customer's online status (e.g., online or offline), and contact information for the caller.

State 4. Optionally, the Session Manager notifies the customer's telecommunications client on the SCP/Call Controller's behalf that there is an incoming call. The client displays the call in its active call window (e.g., a call alert user interface).

State 5. The Call Manager begins playing a greeting (e.g., a canned greeting or a greeting prerecorded by the customer, such as one that states the customer is unavailable and to leave a message after the tone), records a message from the caller, and then hangs-up (or the caller hangs-up).

State 6. The Call Manager logs the call and optionally updates the call frequency information for the contact (e.g., the Call Manager tracks the total number of calls received from a given phone number and/or caller, wherein the "total number of calls" can be the total number of calls received from a specific date, calls received within a specified time period, or otherwise). The telecommunications client or call log web page clears the active call display and optionally adds the call to the top of the call log. Optionally, the recorded message is transmitted to the email address of the subscriber.

State 7. The subscriber logs into his/her email, reviews the recorded message and decides s/he would like a call back from the caller. The subscriber clicks on a link in the email call notification requesting a free call back from the caller as illustrated in an example shown in FIG. 7, which includes a "Click here to get a Call Back" from the caller link 702. The user interface illustrated in FIG. 7 further reports who left the message, the phone address or other phone identifier (e.g., work phone), caller location (e.g., address, city, and/or state), the message length, and the date/time of the call. Optionally, a wholly or partially prepopulated web page is presented to the subscriber with fields for the caller's name and phone number, the subscriber's phone number, and a prepopulated or blank field for the email address of the caller. Optionally, the subscriber can modify one or more of the displayed fields. Optionally, one or more fields are provide via which the caller can indicate a time of day after which they prefer not to be called, a time range that they prefer not to be called, or a time range in which they want to be called.

Figure 7:
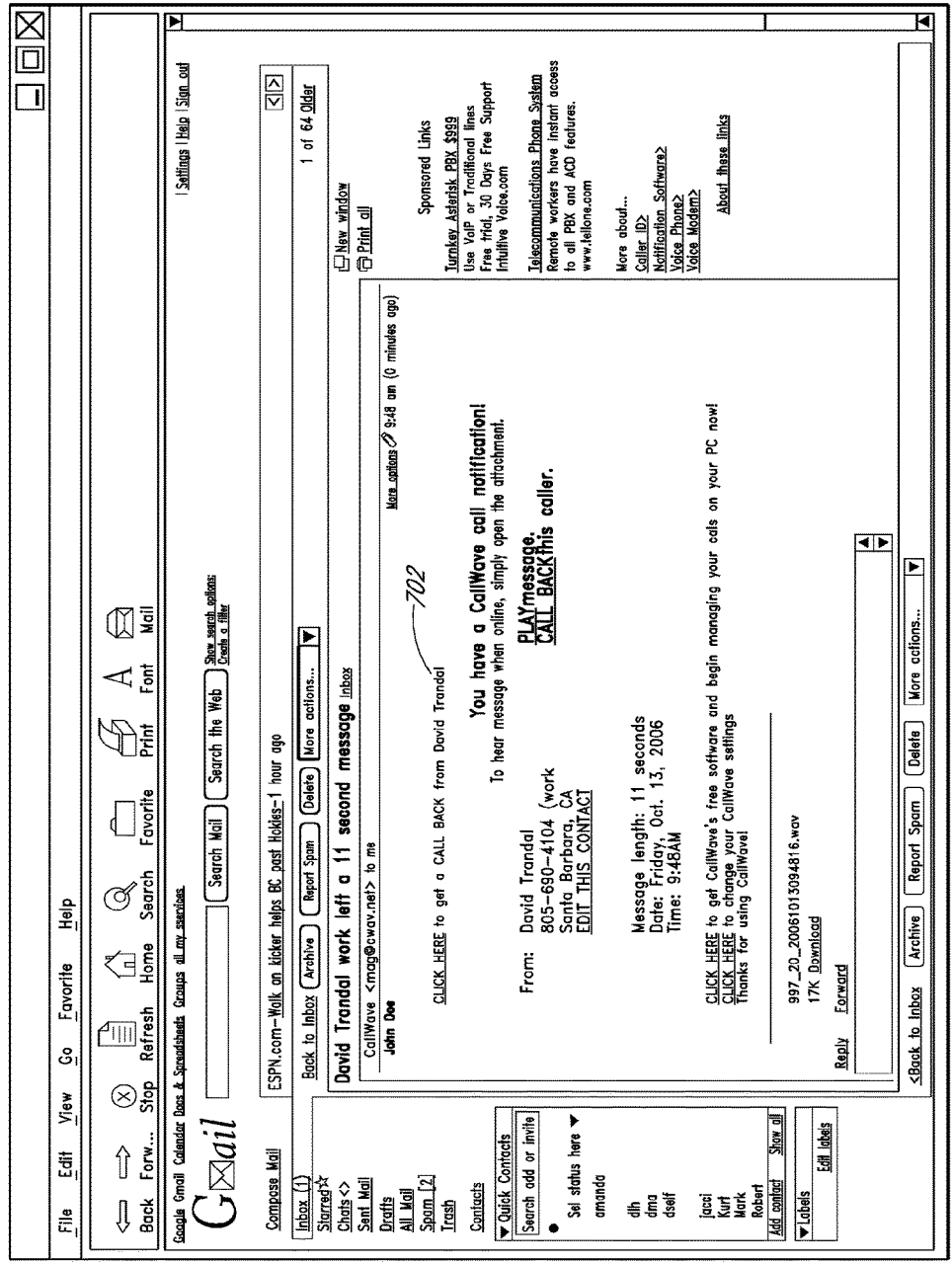
FIG. 7 illustrates an example Call Notification with a link to web interface for sending the caller a Call Back Email message.
Figure 8:
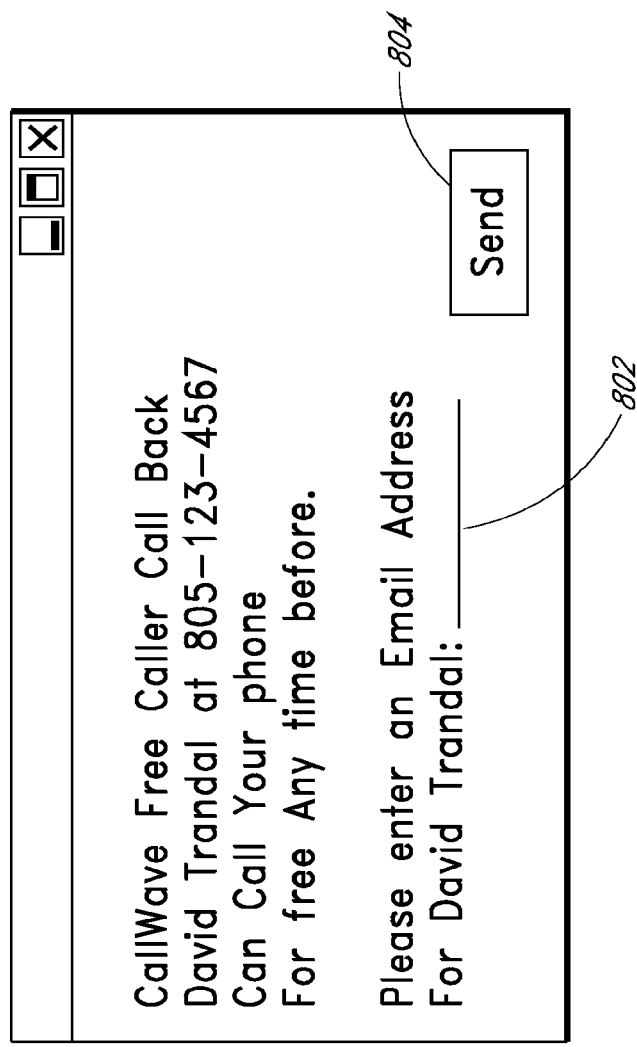
FIG. 8 illustrates an example web page prompting a subscriber to enter the email address of the caller after selecting the Call Back link shown in FIG. 7.

FIG. 8 is an example of a web page user interface displayed to a subscriber in response to selection of the email call notification link (e.g., such as that illustrated in FIG. 7). The user interface displays the original caller's name and the caller phone address from which the original call was placed, and informs the subscriber that the original caller can call the subscriber's phone for free up until a specified date and time. The original caller phone address will optionally be used as part of the call back process. Optionally, the subscriber can access the user's contact record for the caller and can select another caller phone address to be used in the call back operation.

The user interface illustrated in FIG. 8 includes a field 802 is provided via which the subscriber can enter an email address associated with the original caller (other embodiments enable the user to specify other destination addresses associated with the caller, such as an MMS address). Optionally, the email address is prepopulated using information obtained from the subscriber's contact database record for the caller or elsewhere. Clicking a "send" control 804 causes a free calling email invitation to be sent to the caller at the specified email address. Optionally, the subscriber can configure the subscriber's account (e.g., using an account configuration user interface provided via a web page) to cause such a notification to be provided to all callers, to all callers in the subscriber's address book, or certain contacts specifically designated by the subscriber.

Figure 9:
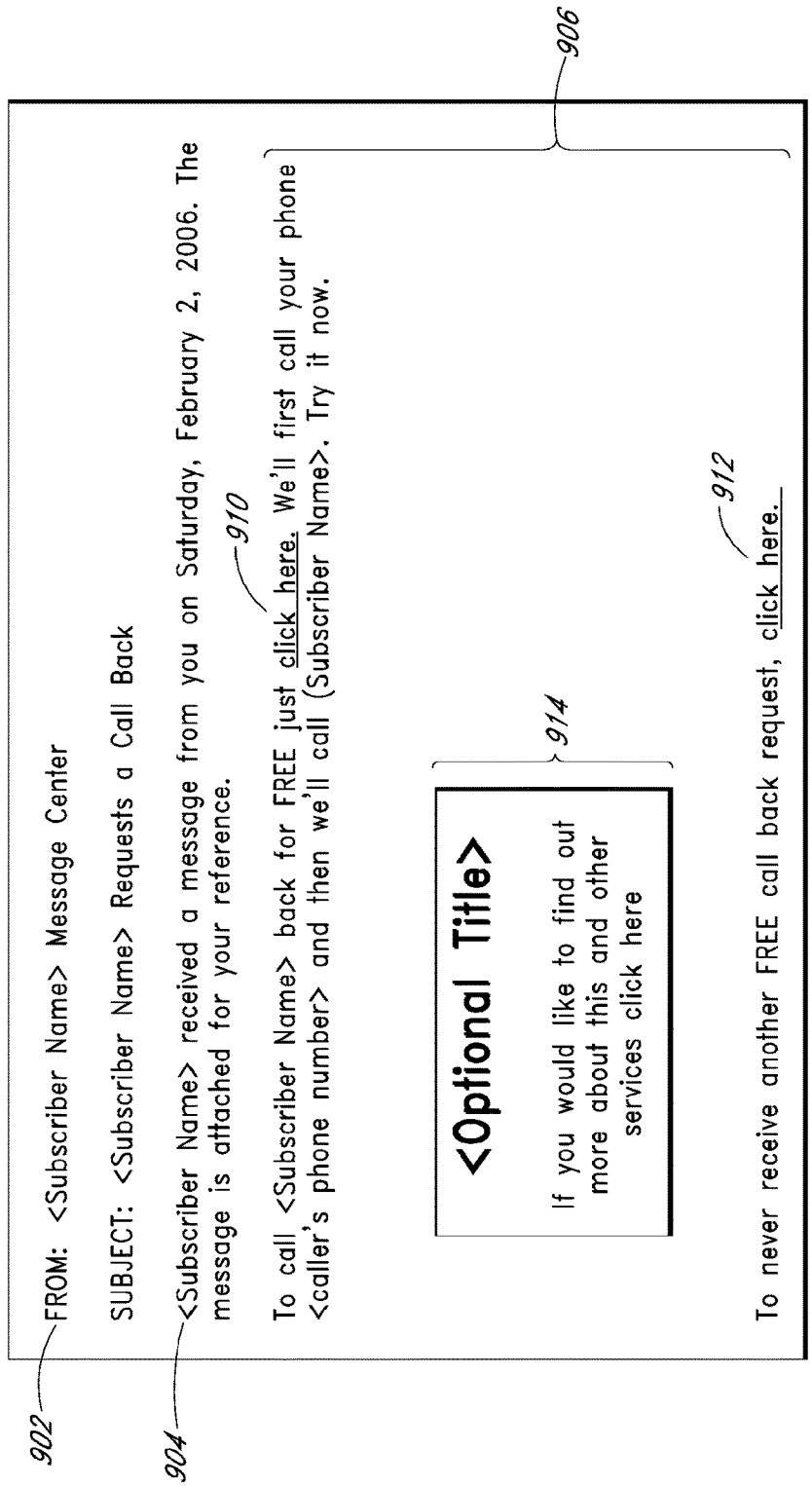
FIG. 9 illustrates an example Email sent by the Subscriber to the Caller to be used in the initiation of a Call Back.

FIG. 9 illustrates an example call back communication in the form of an email sent to the original caller. The email, when received by the caller can be used by the original caller to call back the subscriber for free. The communication includes a "From" field 902 with the name of the subscriber that the caller had previously called and that initiated the communication; a subject field 904 stating that the subscriber is requesting a call back from the call; a message field 906 stating that the subscriber received a message from the caller at a specified date and time; optionally, message previously recorded by the caller for the subscriber is attached for the caller's reference. The message field 906 further includes text informing the original caller that to call back the subscriber for free, the original caller should click a specified call back link 910. The message further explains how the call back procedure will be performed (e.g., the system will first call the caller's phone number and then the subscriber's phone number).

Optionally, the user interface includes a field via which the original caller can specify an alternate caller phone address to which the call back is to be placed. Optionally, an opt out message and link 912 is provided, wherein the opt out message states that if the caller does not want to receive such call back requests in the future the caller should click the opt out link 912. If the caller activates the link, an associated URL is accessed that is associated with the softswitch which records the opt out indication in the link in associated with caller identification information (e.g., the caller phone address or charge number obtained via call signaling information). Then, in the future, if the caller leaves a message for a subscriber, the softswitch will access the caller's instructions from its database (e.g., using the caller phone address or charge number obtained via the call signaling information to locate the instruction in the database), determine that the caller does not want to receive a call back notification, and will not ask the called subscriber if the subscriber wants such a call back message to be transmitted to the caller (or will ask but will not forward the call back notification and so inform the subscriber). The communication optionally also includes a message and corresponding link 914, wherein the message informs the caller that if the caller wants to obtain additional information regarding such telecommunication services, the caller is to activate the link.

State 8. The caller goes online (or is already online) checks the caller's email, accesses and opens the call back communication forwarded from the subscriber, and selects the call back link. FIG. 9 illustrates an example call back communication in the form of an email sent to the original caller. The email, when received by the caller can be used by the original caller to call back the subscriber for free. The communication includes a "From" field 902 with the name of the subscriber that the caller had previously called and that initiated the communication; a subject field 904 stating that the subscriber is requesting a call back from the call; a message field 906 stating that the subscriber received a message from the caller at a specified date and time; optionally, message previously recorded by the caller for the subscriber is attached for the caller's reference. The message field 906 further includes text informing the original caller that to call back the subscriber for free, the original caller should click a specified call back link 910. The message further explains how the call back procedure will be performed (e.g., the system will first call the caller's phone number and then the subscriber's phone number.

Optionally, the user interface includes a field via which the original caller can specify an alternate caller phone address to which the call back is to be placed. Optionally, an opt out message and link 912 is provided, wherein the opt out message states that if the caller does not want to receive such call back requests in the future the caller should click the opt out link 912. If the caller activates the link, an associated URL is accessed that is associated with the softswitch which records the opt out indication in the link in associated with caller identification information (e.g., the caller phone address or charge number obtained via call signaling information). Then, in the future, if the caller leaves a message for a subscriber, the softswitch will access the caller's instructions from its database (e.g., using the caller phone address or charge number obtained via the call signaling information to locate the instruction in the database), determine that the caller does not want to receive a call back notification, and will not ask the called subscriber if the subscriber wants such a call back message to be transmitted to the caller (or will ask but will not forward the call back notification and so inform the subscriber). The communication optionally also includes a message and corresponding link 914, wherein the message informs the caller that if the caller wants to obtain additional information regarding such telecommunication services, the caller is to activate the link.

Figure 10:
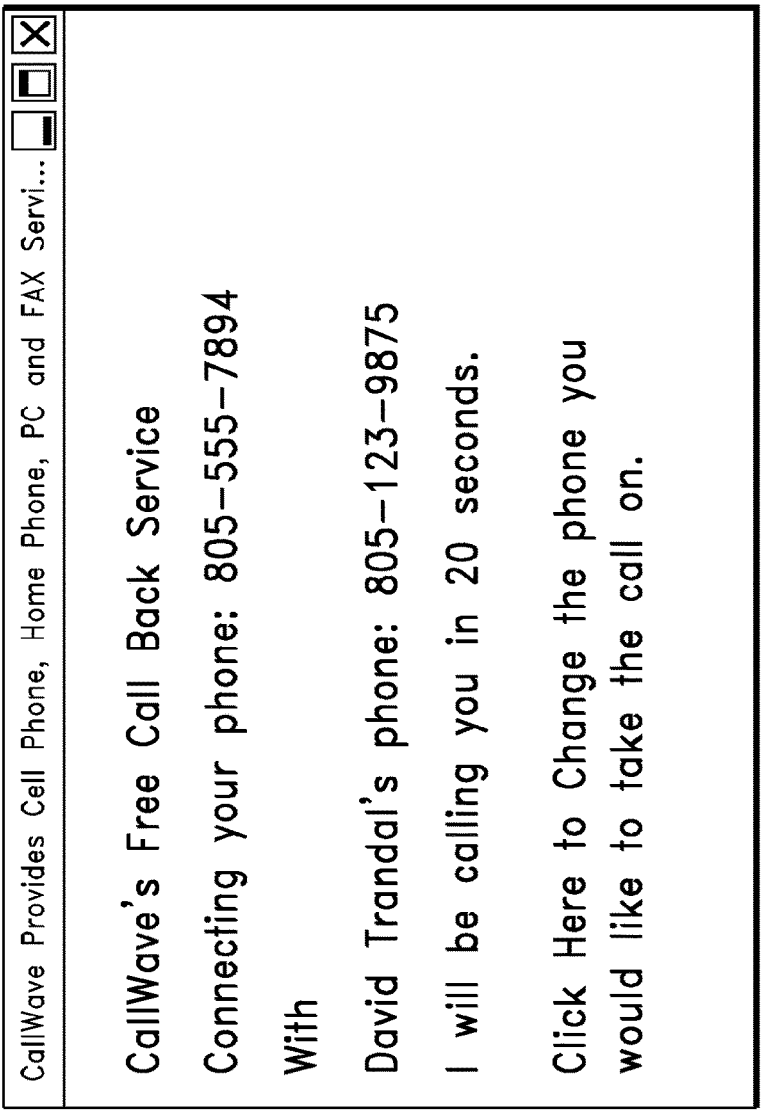
FIG. 10 illustrates an example Web page showing a Call Progress, Call Back User Interface.

Clicking on the callback link causes a web page to pop up (e.g., in a browser or other application) that describes how the Call Back service works. FIG. 10 illustrates an example Call Back user interface. The web page includes a title noting that the web page is associated with the free callback service. The web page further states which and whose phones will be connected. The time until the call to the caller will be placed is provided via a count down counter. When the number of seconds reaches zero, the softswitch begins placing calls as described in the example states below.

State 9. The softswitch originates an outbound call to the caller and optionally plays a brief message introducing the callback. The user interface (e.g., provided via web browser pop-up) displays the call progress (e.g., calling your phone, ringing your phone, answer or other call progress messages).

State 10. The softswitch, upon detecting an answer condition, where the caller has answered the call placed by the softswitch, (or optionally after ring back is received), originates an outbound call to the subscriber. Once the call has been originated, the call is bridged with the call to the caller so the caller can hear ringing. Optionally or in addition, the web browser displays the call progress (e.g., calling <subscriber number>, ringing, answer or similar call progress messages). An analog or digital clock can optionally be presented in the web browser when the subscriber answers to give the caller an indication of the length of the call.

State 11. Once the call connecting the subscriber and caller completes (e.g., upon a hang-up by one of the participants), the user interface presented in the web browser can optionally update the call progress with the length of call and a notice that the call has ended. Optionally, an invite to register for the service is presented via a user interface on the web browser with a web form or other user interface to receive/capture necessary and/or desired information.

State 12. If the window was closed during the phone call, optionally the subscriber can still click on the link of the invitational email to find out additional information about the telecommunication service (or other services) offered by the service provider and/or register for these services.

Optionally at state 7, the subscriber forwards the call notification message to the caller, the notification including a link that can be used by the caller to call back the subscriber for free. The notification can include a portion of the voice message (e.g., in voice format and/or a text version of the voice message) recorded by the caller for the called party to aid the caller in associating the notification with a specific previous call by the caller. FIG. 4, discussed above, is an example Voice Mail to Email message with an embedded link 401 that can be used by the original caller to call the subscriber back for free. Optionally, when the link is selected by the caller, this causes a web browser to open and displays call progress as illustrated in FIG. 10.

Referring to FIG. 10, the user interface informs the original caller that a free call is being placed to a phone number associated with the original caller (e.g., the phone address from which the original caller placed the original call, which was obtained from call signaling information associated with the original call).

Optionally, at state 8, the web browser pop up may require the original caller to enter the phone number s/he would like to return the free call to. If the number entered is not the subscriber's (or contact information related to the subscriber (e.g., mobile phone number)) an error message may be displayed stating that the "free" feature is not available to this number. Optionally, a message can be displayed allowing a call back but letting the subscriber know this is not a free service and/or is not included in the existing service.

Further, at state 8, the softswitch optionally determines that the original call from the caller to the subscriber was made from a cell phone (for example, by querying a database). In this case, optionally, the softswitch prompts the user, via the web browser display (or the telecommunications client), by asking the user if the user would like to receive the call on another line. If so, the subscriber can enter a new phone number to be called in a corresponding field. Optionally, the visual interface displays a bridge number the subscriber can call into (rather than the softswitch originating the call leg to the subscriber), a local calling number, and/or a toll free number by way of example.

Optionally, at state 9, the softswitch displays other information beyond call progress. For example, the browser optionally displays an Avatar (e.g., an animated character) figure. The Avatar figure optionally lip syncs with a player speaking the call progress steps. Optionally, when the call is connected in state 10, the Avatar figure lip syncs with the called party (e.g., wherein the softswitch detects spoken words on a leg of the bridge call and syncs with the expressions and lips of the Avatar displayed to the caller). The Avatar can be a generic character created by the service provider, a custom Avatar created by the called party, or an Avatar selected by the caller.

Certain embodiments can be used in conjunction with the systems and methods described in U.S. patent application Ser. No. 11/854,381, filed Sep. 12, 2007, the contents of which are incorporated herein in their entirety.

Optionally at State 9, the softswitch prompts the caller to take the call from the caller's computer or other softphone (e.g., to reduce the cost to the service provider and/or improve the quality of the call). In this example, the caller enters or otherwise provides the caller's softphone address and the softswitch generates a VoIP call to the caller's computer (or other designated softphone). In another example, the forwarded message optionally includes a softphone client application which optionally automatically installs (or in response to a user gesture) on the caller's computer or other host. This "softphone" can optionally be used to call the subscriber back rather than using the bridged call scenario described above.

Optionally, the call to the subscriber is made by the softswitch so the call should be "free" to the caller, although this may depend upon the calling plan of the caller. For example, depending on their cell phone service provider plan, the call might not be free to the caller if the caller took the call from their cell phone.

Optionally, the subscriber can send free (or optionally reduced cost) calling messages to one or more of his contacts or in response to calls. Optionally, the call processing system can limit the number and/or length of "free/reduced cost" calls between two called parties by day, month, class of service, or other means.

While certain of the above examples refer to calls forwarded to the softswitch (e.g., on a ring-no-answer condition), the calls optionally could have been placed directly to the softswitch. For example, the call could have been placed to a virtual phone number associated with the customer and "owned" by the softswitch, so that calls to the virtual phone number are received at the softswitch without needing to be forwarded (e.g., where the call terminates directly on the softswitch). A customer account can be enabled for the free calling service in the softswitch.

While the foregoing detailed description discloses several embodiments of the present invention, it should be understood that this disclosure is illustrative only and is not limiting of the present invention. It should be appreciated that the specific configurations and operations disclosed can differ from those described above, and that the methods described herein can be used in contexts other than for providing free call backs.

What is claimed is:

1. A system, comprising:
   at least one networked computing device comprising hardware;
   a network interface;
   non-transitory memory that stores instructions that when executed by the at least networked one computing device:
   enables at least in part communications, using the network interface, over a network with a first instance of a software application installed on a first computing device of a user and with a second instance of the software application installed on a second computing device of the user;
   enables receipt by the system of a call from a caller directed to the user;
   detects an online presence of the first computing device of the user;
   detects an online presence of the second computing device of the user;
   at least partly in response to the online presence detection of the first computing device of the user and the online presence detection of the second computing device of the user,
   enables a display of information, associated with the received call directed to the user, via a user interface of the first instance of the software application installed on the first computing device and via a user interface of the second instance of the software application installed on the second computing device; and
   at least partly in response to receiving the call, enables the user to originate, via a control presented, in association with the display of information associated with the received call directed to the user, in the user interface of the first instance of the software application installed on the first computing device, a callback to the caller and a text reply to the caller.

2. The system as defined in claim 1, wherein the first computing device of the user comprises a smart phone.

3. The system as defined in claim 1, wherein the second computing device of the user comprises a personal computing device.

4. The system as defined in claim 1, the operations further comprising: including in the message displayed to the user a link to a portion of a voice message left by the caller.

5. The system as defined in claim 1, wherein the call directed to the user comprises a call placed to a phone number associated with the first computing device or the second computing device of the user.

6. The system as defined in claim 1, wherein the first instance of the software application on the first computing device initiates the online presence of the first computing device.

7. The system as defined in claim 1, wherein the second instance of the software application on the first computing device initiates the online presence of the second computing device.

8. The system as defined in claim 1, wherein the first instance of the software application on the first computing device initiates the online presence by transmitting a message over the network.

9. The system as defined in claim 1, wherein the text reply to the caller comprises an SMS text reply.

10. A system, comprising:
    at least one networked computing device comprising hardware;
    a network interface;
    non-transitory memory that stores instructions that when executed by the at least networked one computing device:
    enables at least in part communications, using the network interface, over a network with a first instance of a software application installed on a first computing device of a user and with a second instance of the software application installed on a second computing device of the user;
    enables receipt by the system of a call from a caller directed to the user;
    detects an online presence of the first computing device of the user;

detects an online presence of the second computing device of the user;

at least partly in response to the online presence detection of the first computing device of the user and the online presence detection of the second computing device of the user, enables a display of information, associated with the received call directed to the user, via a user interface of the first instance of the software application installed on the first computing device and via a user interface of the second instance of the software application installed on the second computing device; and at least partly in response to receiving the call, enables the user to originate, via a control presented, in association with the display of information associated with the received call directed to the user, in the user interface of the second instance of the software application installed on the second computing device, a text reply to the caller.

11. The system as defined in claim 10, wherein the first computing device of the user comprises a smart phone.

12. The system as defined in claim 10, wherein the call directed to the user comprises a call placed to a phone number associated with the first computing device or the second computing device of the user.

13. The system as defined in claim 10, wherein the second instance of the software application on the second computing device initiates the online presence of the second computing device.

14. The system as defined in claim 10, wherein the second instance of the software application on the second computing device initiates the online presence of the second computing device by transmitting a message over the network.

15. The system as defined in claim 10, wherein the text reply to the caller comprises an SMS text reply.

16. A system, comprising:
at least one networked computing device comprising hardware;
a network interface;
non-transitory memory that stores instructions that when executed by the at least networked one computing device:
enables at least in part communications, using the network interface, over a network with a first instance of a software application installed on a first computing device of a user and with a second instance of the software application installed on a second computing device of the user;

enables receipt by the system of a call from a caller directed to the user;

detects an online presence of the first computing device of the user;

detects an online presence of the second computing device of the user;

at least partly in response to the online presence detection of the first computing device of the user and the online presence detection of the second computing device of the user, enables a display of information, associated with the received call directed to the user, via a user interface of the first instance of the software application installed on the first computing device and via a user interface of the second instance of the software application installed on the second computing device; and at least partly in response to receiving the call, enables the user to originate, via a control presented, in association with the display of information associated with the received call directed to the user, in the user interface of the second instance of the software application installed on the second computing device, a callback to the caller.

17. The system as defined in claim 16, wherein the call directed to the user comprises a call placed to a phone number associated with the first computing device or the second computing device of the user.

18. The system as defined in claim 16, wherein the second instance of the software application on the second computing device initiates the online presence of the first computing device.

19. The system as defined in claim 16, wherein the second instance of the software application on the second computing device initiates the online presence of the second computing device by transmitting a message over the network.

20. The system as defined in claim 16, wherein the first computing device of the user comprises a smart phone.

* * * * *